US008830041B2

(12) United States Patent
Liu et al.

(10) Patent No.: US 8,830,041 B2
(45) Date of Patent: Sep. 9, 2014

(54) APPARATUS FOR PROVIDING HAPTIC FEEDBACK

(75) Inventors: Lin Liu, Shenzhen (CN); Jie He, Shenzhen (CN)

(73) Assignees: AAC Acoustic Technologies (Shenzhen) Co., Ltd., Shenzhen (CN); AAC Technologies Holdings, Inc., Grand Cayman (KY)

( * ) Notice: Subject to any disclaimer, the term of this patent is extended or adjusted under 35 U.S.C. 154(b) by 248 days.

(21) Appl. No.: 13/534,143

(22) Filed: Jun. 27, 2012

(65) Prior Publication Data
US 2012/0326854 A1 Dec. 27, 2012

(30) Foreign Application Priority Data

Jun. 27, 2011 (CN) .......................... 2011 1 0174801

(51) Int. Cl.
H04B 3/36 (2006.01)

(52) U.S. Cl.
USPC ......... 340/407.1; 310/338; 345/156; 345/418

(58) Field of Classification Search
CPC ................................ G06F 3/017; G06Q 30/02
USPC .................... 340/407.1, 407.2; 345/156, 418; 310/338, 339
See application file for complete search history.

(56) References Cited

U.S. PATENT DOCUMENTS

| 7,148,789 B2* | 12/2006 | Sadler et al. ............... 340/407.1 |
| 7,952,261 B2* | 5/2011 | Lipton et al. ................. 310/339 |
| 8,653,721 B2* | 2/2014 | Liu et al. ...................... 310/339 |
| 2006/0028428 A1* | 2/2006 | Dai et al. ...................... 345/156 |
| 2007/0229455 A1* | 10/2007 | Martin et al. ................. 345/156 |
| 2012/0326568 A1* | 12/2012 | Liu et al. ...................... 310/348 |

* cited by examiner

*Primary Examiner* — George Bugg
*Assistant Examiner* — Edny Labbees
(74) *Attorney, Agent, or Firm* — Anova Law Group, PLLC

(57) ABSTRACT

Disclosed is an apparatus for providing haptic feedback. The apparatus includes a frame having a protrusion extending from the side wall of the frame, a piezoelectricity vibrator including a substrate having a main body, at least one piezoelectric layer attached to the main body of the substrate, the main body defining two contact portions extending out of the side facing to the frame, and the two contact portions clip the protrusion for fixing together. The apparatus includes a first through hole arranged on the protrusion and two second through holes respectively arranged on the two contact portions and corresponding to the first through hole, and a screw passing through the second through holes and the first through hole for engaging the contact portions with protrusion together.

19 Claims, 4 Drawing Sheets

APPARATUS FOR PROVIDING HAPTIC FEEDBACK

FIELD OF THE INVENTION

The present invention generally relates to apparatuses for providing haptic feedbacks.

DESCRIPTION OF RELATED ART

In recent years, with the rapid development of mobile communication technology, portable consumer electronic devices are widely used by users to enjoy more and more entertainment contents, like music, videos, and games. The consumer electronic devices include cell phones, personal digital assistants (PDAs), and portable multi-media players.

Feedback technology is being applied into devices such as mobile phones, handheld computers or portable games. Some traditional devices usually provide feedback to the user by the manner of visual or auditory, such as video player and audio player. There are also some devices can provide a more intense feedback to the user by the manner of motive feedback (such as the active force and resistance feedback) or haptic feedback (such as vibration or heat). Specifically, the haptic feedback with vibration well reflect in the video games of user's devices. For example, the explosion in the games will cause strong vibration effect, and water droplets will cause slighter vibration effect. The needs of these experiences are constantly being heated.

The structure of the haptic feedback device has been gradually improved. Related haptic feedback device includes a base, a vibration unit supported by the base, a frame connecting the vibration unit, a touch screen attached on the frame, and a connecting portion connecting the frame to the vibration unit. However, in the related technologies, the connecting portion is manufactured according to outlines of the base and the frame respectively, so that the connecting portion has a complicate structure and the assembly process is difficult, thereby reducing the production efficiency of the product.

Therefore, it is necessary to provide a new apparatus for proving haptic feedback with simplified structure.

Figure 1:
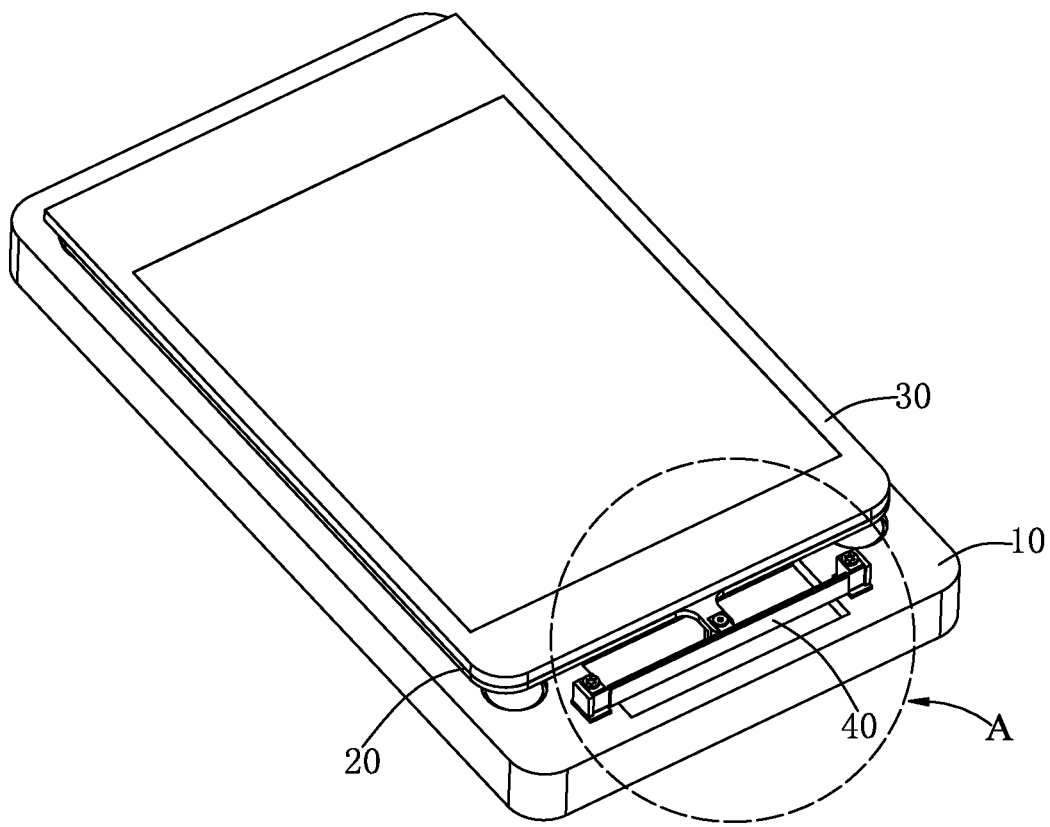
FIG. 1 is an isometric view of an apparatus for providing haptic feedback in accordance with an exemplary embodiment of the present disclosure.

Many aspects of the embodiment can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiment of the present disclosure in detail.

The present disclosure is presented for providing the user with intensive interaction experience. For example, if a user taps on a touch screen of a portable gaming, the user will get a tactile feedback, such as vibration, from the touch screen.

Referring to FIG. 1, an apparatus 100 for providing haptic feedback, in accordance with an exemplary embodiment of the present disclosure, includes a base 10, a frame 20 fixed on the base 10, a touch screen module 30 located on the frame 20, a piezoelectric vibrator 40 positioned on the base 10 and connected to the frame 20, and a fixing portion for fixing the piezoelectric vibrator 40 on the frame 20 firmly. The piezoelectric vibrator 40 is a type of electric motor based upon the change in shape of a piezoelectric material when an electric field is applied. Piezoelectric vibrators make use of the converse piezoelectric effect whereby the material produces vibrations in order to produce a motion.

Figure 2:
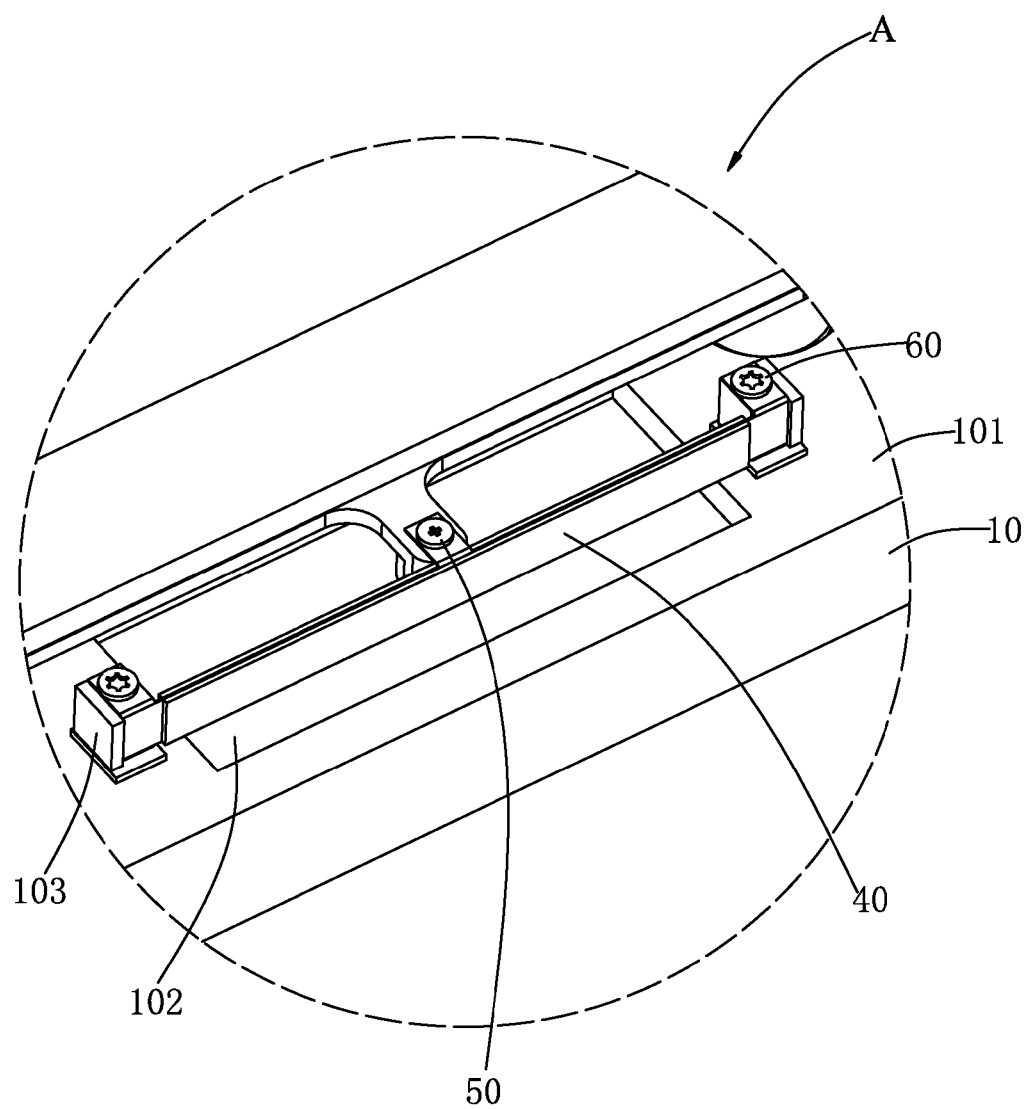
FIG. 2 is an enlarged view of the area A in FIG. 1.
Figure 3:
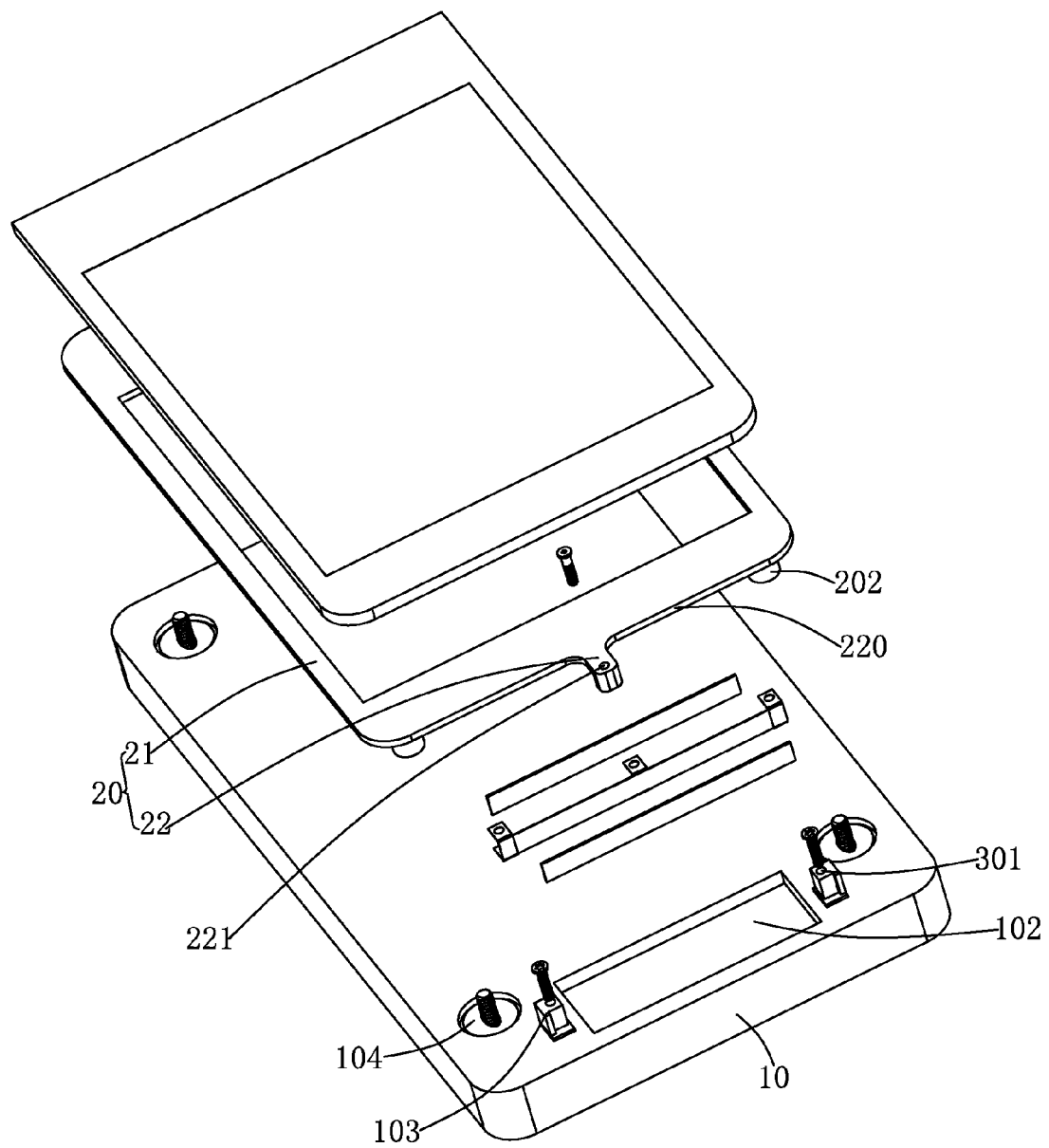
FIG. 3 is an exploded view of the apparatus in FIG. 1.

Referring to FIGS. 2 to 3, the base 10 has a main surface 101 having an accommodation space 102 for receiving the piezoelectric vibrator 40, a pair of steps 103 with a fastening hole 301 located near the accommodation space 102, and several grooves 104 providing on a periphery of the base 10. The piezoelectric vibrator 40 is supported and fixed by the two steps 103 and partially suspended in the accommodation space 102.

The frame 20 includes a ring body 21 having a side wall 220 and connecting with the touch screen module 30, and a protrusion 22 extending outwardly from the side wall 220 of the ring body 21 for connecting with the piezoelectric vibrator 40. The protrusion 22 further includes a first through hole 221 therein. The ring body 21 has a bottom surface and a several bulges 202 extending from the bottom surface for fixing the frame 20 on the base 10 together with the grooves 104.

Figure 4:
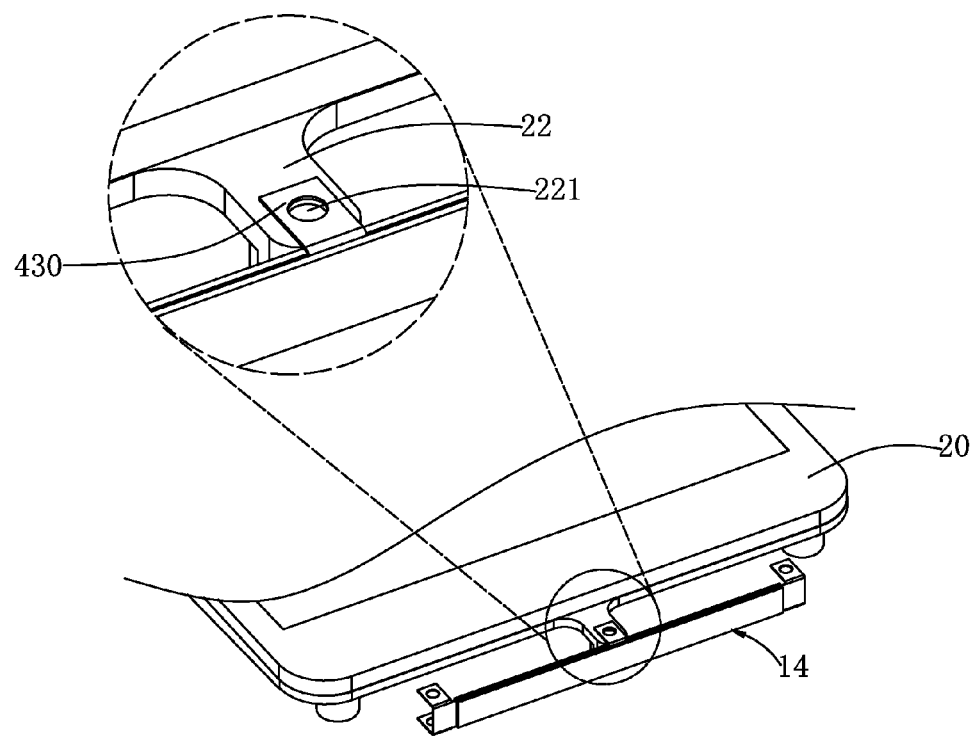
FIG. 4 is a partial view of the apparatus for providing haptic feedback, showing a piezoelectric vibrator connected with a protrusion of a frame.
Figure 5:
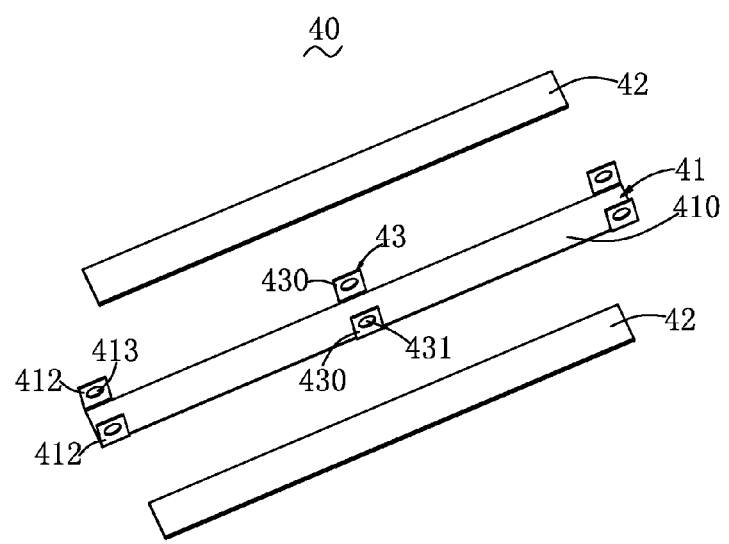
FIG. 5 is an exploded view of the piezoelectric vibrator of the apparatus for providing haptic feedback.

Further referring to FIGS. 4-5, the piezoelectric vibrator 40 includes a substrate 41 having a main body 410, a first piezoelectric layer 42 attached to one side of the main body 410 of the substrate 41 and a second piezoelectric layer 42 attached to the other side of the main body 410 of the substrate 41. The main body 40 has a clip portion 43 at a middle portion thereof for engaging with the protrusion 22. The clip portion 43 includes two contacting pieces 430 extending perpendicularly from two edges of the main body 410 of the substrate 41 and toward the frame 20 for engaging with the protrusion 22. Each contacting piece 430 has a second through hole 431 corresponding to the first through hole 221 therein. The combination of the main body and the clip portion 43 forms a slot for receiving the protrusion 22 therein. The contacting piece is parallel to the protrusion 22.

Optionally, the substrate 41 further includes a pair of clip members 412 extending perpendicularly from two ends of the substrate 41. Each clip member forms a third through hole 413 therein.

Screw threads are provided on inner sides of the through holes, and accordingly, the fixing portion comprises screws. In this embodiment, the fixing portion has a first fixing portion 50 passing through the first and second through holes for fixing the piezoelectric vibrator 40 on the frame 20 firmly and several second fixing portion 60 passing through the third through holes 413 and the corresponding fastening hole 31 for fixing the piezoelectric vibrator 40 on the base 10 firmly.

According to the apparatus for proving haptic feedback, the structure is simple and the assembly process is convenient to be performed, and the production efficiency is increased.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An apparatus for proving haptic feedback, comprising:
a base;
a frame mounted on the base with a ring body and a protrusion extending outwardly from the ring body;
a piezoelectric vibrator fixed on the base, including a substrate with a main body and at least one piezoelectric layer attached to the substrate;
a clip portion extending out of the substrate and toward the frame for connecting with the protrusion of the frame.

2. The apparatus for providing haptic feedback as described in claim 1, wherein the clip portion includes a pair of contacting pieces respectively extending from two opposite edges of the main body of the substrate for clipping the protrusion.

3. The apparatus for providing haptic feedback as described in claim 2 further including a first through hole in the protrusion, two second through holes in the contacting pieces corresponding to the first through hole, and a first fixing portion passing through the first through hole and the two second through holes and corresponding to the two second through holes for fixing the clip portion on the protrusion firmly.

4. The apparatus for providing haptic feedback as described in claim 3, wherein the pair of contacting pieces is perpendicular to the main body of the substrate.

5. The apparatus for providing haptic feedback as described in claim 4, wherein the pair of contacting pieces locates in the middle edge of the main body of the substrate.

6. The apparatus for providing haptic feedback as described in claim 5, wherein the pair of contacting pieces opposite to each other.

7. The apparatus for providing haptic feedback as described in claim 1, wherein the base further includes a pair of steps for supporting the piezoelectricity vibrator.

8. The apparatus for providing haptic feedback as described in claim 7, wherein the base has a main surface having an accommodation space for receiving the piezoelectric vibrator, and the piezoelectric vibrator is partially suspended in the accommodation space.

9. An apparatus for proving haptic feedback, comprising:
a base;
a frame connecting to the base and having a side wall, and a protrusion extending out of the side wall;
a piezoelectric vibrator fixed on the base, including a substrate having a main body with two opposite sides, a first piezoelectric layer attached to one side of the main body of the substrate; wherein
the main body has two contacting pieces extending out of the side facing to the frame, and the two contacting pieces clip the protrusion for fixing together.

10. The apparatus for providing haptic feedback as described in claim 9 further including a first through hole arranged on the protrusion and two second through holes respectively arranged on the two contacting pieces and corresponding to the first through hole, and a screw passing through the first through hole and the second through holes for cooperating contacting pieces and protrusion together.

11. The apparatus for providing haptic feedback as described in claim 10, wherein the two contacting pieces extend out from the two opposite edges of the side facing to the frame.

12. The apparatus for providing haptic feedback as described in claim 11, wherein the two contacting pieces are vertical to the main body of the substrate.

13. The apparatus for providing haptic feedback as described in claim 12, wherein the two contacting pieces are opposed from each other.

14. The apparatus for providing haptic feedback as described in claim 9 further comprising a second piezoelectric layer attached to another side of the main body of the substrate.

15. The apparatus for providing haptic feedback as described in claim 9, wherein the base further includes a pair of steps for supporting the piezoelectricity vibrator.

16. An apparatus for providing haptic feedback, comprising:
a frame having a protrusion with a first through hole therein;
a piezoelectric vibrator including a substrate having a main body and at least one piezoelectric layer attached to the main body of the substrate;
a pair of contacting pieces with second through holes extending from the two opposite edges of the main body of the substrate and facing to the protrusion;
a first screw arranged to pass through the first through hole and second through holes for fixing the pair of contacting pieces and the protrusion firmly.

17. The apparatus for providing haptic feedback as described in claim 16, wherein the protrusion locates between the pair of the contacting pieces.

18. The apparatus for providing haptic feedback as described in claim 16, wherein the protrusion is parallel to the contacting pieces.

19. The apparatus for providing haptic feedback as described in claim 16, wherein the pair of contacting pieces is vertical to the main body of the substrate.

* * * * *